United States Patent [19]

Hasty

[11] Patent Number: 5,070,644
[45] Date of Patent: Dec. 10, 1991

[54] BOUQUET HOLDER ASSEMBLY

[76] Inventor: Doris M. Hasty, 950 No. Rt. 53, Addison, Ill. 60101

[21] Appl. No.: 382,544

[22] Filed: Jul. 19, 1989

[51] Int. Cl.$^5$ .............................................. A01G 5/04
[52] U.S. Cl. .................................. 47/41.12; 47/41.01
[58] Field of Search ............. 16/110 R, 111 R, 116 R; 47/41.12, 55, 72, 41.01; 206/423; 229/87.01

[56] References Cited

U.S. PATENT DOCUMENTS

| | | | |
|---|---|---|---|
| 1,541,923 | 6/1925 | Cunningham | 47/41.01 |
| 4,204,365 | 5/1980 | Hirvi | 47/41.12 |

FOREIGN PATENT DOCUMENTS

| | | | |
|---|---|---|---|
| 1157678 | 6/1958 | France | 47/41.01 |

OTHER PUBLICATIONS

Advertisement for "Aqua Bouquet Holder", Florist's Review Dec. 22, 1977, p. 46.

Primary Examiner—Robert L. Spruill
Assistant Examiner—Carmine Cuda
Attorney, Agent, or Firm—Potthast & Ring

[57] ABSTRACT

A bouquet holder assembly (10) with a holding element (14) within a cylindrical cage (12A) and a conical wall (12B) of a head (12) and a handle assembly 17 attached to the head (12) with an inner, relatively rigid, plastic inner handle member (17A) and an outer handle (17B). The outer handle member (17B) is made of flexible material, such as cloth, in the form of a sheath to cover both the inner handle member (17A) and the conical wall (12B) of the head (12). The outer handle member (17B) is formed of two layers, an outer decorative layer (26) with decorative elements (30, 32) and a padded sponge-like moisture absorbent inner layer (28). The outer handle members (17B) are made in multiple styles at one location (38) and then assembled at a retail distribution center (40) with uni-style inner holder elements from another location (36) pursuant to special customer orders.

30 Claims, 2 Drawing Sheets

BOUQUET HOLDER ASSEMBLY

BACKGROUND OF THE INVENTION

This invention relates to a bouquet holder assembly and a method of manufacturing same and, more particularly, to a bouquet holder assembly having a handle with an outer flexible layer of cloth.

Bouquet holders of the type having a head with an element for holding the stems of a bouquet of flowers and an elongate, rigid, plastic handle for holding the bouquet are well known. The upper part of the head has a cylindrically shaped, plastic cage, or frame, with openings for receipt of flower stems therethrough to be held by the composite holding medium, or element, mounted within the cylindrical cage. The back part of the head comprises a substantially solid plastic conical wall joined to the cylindrical frame at its wide end for holding a conical section of composite holding medium. The elongate, planar handle is integrally joined to a narrow part of the conical wall opposite the cylindrical frame at a neck juncture and extends away therefrom in a direction forming an obtuse angle relative to the major axes of both the cylindrical frame and the conical wall which coincide. The neck juncture is narrowed relative to the widest part of the elongate handle adjacent thereto which gradually tapers in width to its narrowest part of the elongate handle at its free distal end. The handle and conical wall of the head are integrally molded together, while the cylindrical frame of the head is adhered to the open end of the conical wall after the composite holding element is inserted therebetween. These known bouquet holders are individually sold to flower shops where the actual flower bouquets are made by inserting flowers through the openings in the cylindrical cage and into the composite holding medium therewithin according to customer orders.

While this known bouquet holder functions reasonably well to hold the bouquet of flowers, it still suffers from certain disadvantages associated with the plastic conical wall of the back part of the head and the plastic elongate handle. Since both are generally made from only white plastic, they aesthetically often do not match the flowers or the attire of the customer, such as a bride-to-be obtaining bouquet for herself and her maids of honor.

In order to overcome this problem, it has been known for florists and others who make bouquets pursuant to special order, to wrap satin, rayon or other silk-like ribbons around the elongate plastic handle of different colors selected to complement the color of the bouquet or the color of the formal wear or other clothing which will be worn by the customer when carrying the bouquet. These ribbons are wrapped by hand and held in place by adhesive applied from a manually operated glue gun or the like by the person doing the wrapping. Because the ribbon is spiralled around the length of the elongate handle, it is difficult to cover the tip of the distal, free end of the handle; because the ribbon is relatively narrow and the handle relatively thin, the wrapping process is slow, tedious work.

Likewise, since the conical wall portion of the head to which the elongate handle is attached does not facilitate wrapping with ribbon, it has been known to manually cover the outside conical wall with a plurality of artificial silk flower petals which are held to the conical wall by adhesive. The adhesive is applied manually with a hot glue gun, one petal at a time. Disadvantageously, this work is also slow, exacting and tedious. In addition, an inventory of artificial flower petals of different colors must be kept in addition to the inventory of ribbon. Adding to the inventory problem, the colors of the artificial petals preferably should identically match the corresponding colors of the ribbon.

In addition to the excessive labor and inventory problem, the need to use significant amounts of what can sometimes be odoriferous, noxious or hypoallergenic glue in proximity to or touching a person's hand should be avoided as much as possible. Its use in proximity to flowers both of the bouquet and usually within the flower shop where the hand wrapping is generally performed is also preferably avoided or minimized.

Bouquets should never be dropped, but this is, of course, most important during the actual ceremonies and attendant photographic sessions. Unfortunately, it has also been noted that the thin plastic handles of known bouquet holders are difficult to grasp partly due to their thinness. This is particularly true when they become moist or oily from being held for long periods, such as by a very nervous bride. The ribbons used to wrap the handles are themselves quite thin and add little to the total thickness of a wrapped handle or to moisture absorbency.

SUMMARY OF THE INVENTION

It is therefore the principal object of the present invention to provide a bouquet holder assembly with an improved handle assembly which overcomes or minimizes the disadvantages of known bouquet holders noted above and a method of making same.

The improved handle assembly has a relatively rigid inner handle member for structural support of the head of the bouquet holder which holds the flowers and an outer handle member which surrounds a substantial portion of the inner handle. This outer handle has a relatively flexible layer with its own structural integrity to maintain a configuration like that of the inner handle member but independently of support by the inner handle member to enable it to be slid onto the inner handle member and to be shipped and stored in a flattened state.

Preferably, the flexible layer is made of material which is relatively moisture absorbent compared to the inner handle to absorb perspiration or oil and increase friction to reduce the slipping problem noted above. Further reducing the risk of slipping, the outer handle member is at least as thick as the inner handle member, so that the thickness of the entire handle assembly becomes substantially enlarged for easier handling. An inner layer may be padded by sponge-like or moisture absorbent resilient material.

In addition, in the preferred embodiment, the outer handle member comprises a sheath formed of an inner moisture absorbent layer and an outer, relatively less moisture absorbent, but decorative layer. In one embodiment, the outer decorative layer comprises ribbon which is pre-wrapped around the inner layer, preferably by machine at a manufacturing plant, and in another embodiment, the outer layer comprises decorative cloth with decorative brocade patterns or other decorative elements.

Preferably, the outer handle member has an outer handle extension with a conical shape generally conforming to that of the conical head portion which is thereby covered when the inner handle member is fully inserted into the sheath-like outer handle member.

While some small amount of adhesive can be used, the adhesive can be eliminated entirely by use of other means for holding the outer handle member attached to the inner handle member. In one embodiment, the inner handle member has a narrowed neck adjacent the conical part of the head, and a tie member, such as a decorative ribbon, is tied around the outer handle member to cinch it to the inner handle member at the neck. In another embodiment, the outer handle extension is releasibly hooked to the head by means of a suitable non-adhesive fastener such as a hook or the like.

Substantial labor savings can be achieved using the method of manufacturing the bouquet holder assembly of the present invention by following the steps of producing a head assembly having a holding medium attached to a relatively rigid elongate inner handle, manufacturing a sheath having a shape and size to slideably receive the elongate inner handle therewithin, and assembling the head assembly with the sheath by inserting the elongate handle into the sheath.

In addition to labor savings, a preferred method of manufacturing the bouquet holder at two different locations is provided to also reduce inventory requirements and speed production of bouquet holder assemblies pursuant to special order, comprising the steps of: (1) manufacturing a plurality of the relatively rigid inner handle elements and relatively rigid head and holder element together with a substantially identical size and shape at a first location; (2) manufacturing the relatively flexible outer handle element at a second location in a selected plurality of different styles all of which are of substantially identical in size and shape to those of the plurality of assembled heads and relatively rigid handles to attachably slide onto the relatively rigid handles; (3) shipping a plurality of substantially identical assembled heads and handles to a third location where orders for bouquets are received and which are spaced from said first and second locations; (4) shipping a plurality of flexible handles to said third location; and (5) assembling complete bouquets at the third location by assembling relatively rigid head assemblies with relatively flexible outer handle elements of different styles selected according to orders received at said third location by sliding a selected outer handle element onto an inner handle element.

BRIEF DESCRIPTION OF THE DRAWING

Those objects, features and advantages of the invention will be described in greater detail and other advantageous features of the invention will be made apparent in the detailed description of the preferred embodiment, which is given with reference to the several figures of the drawing, in which.

DETAILED DESCRIPTION

Figure 1:
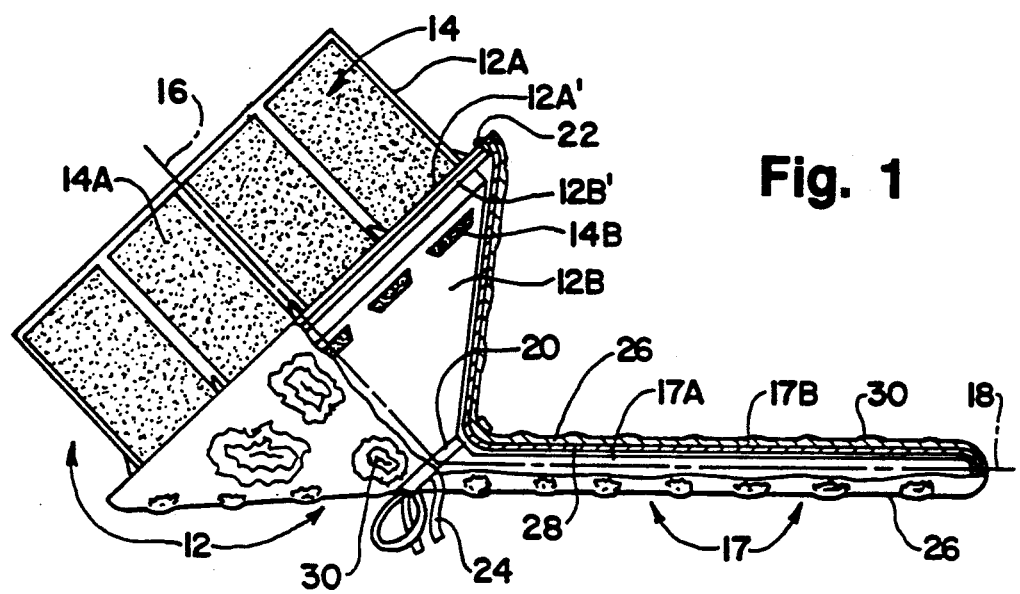
FIG. 1 is a side view of one form of the preferred embodiment of the bouquet holder assembly of the present invention, partially in cross-section to illustrate details of the inner and outer handle members.
Figure 2:
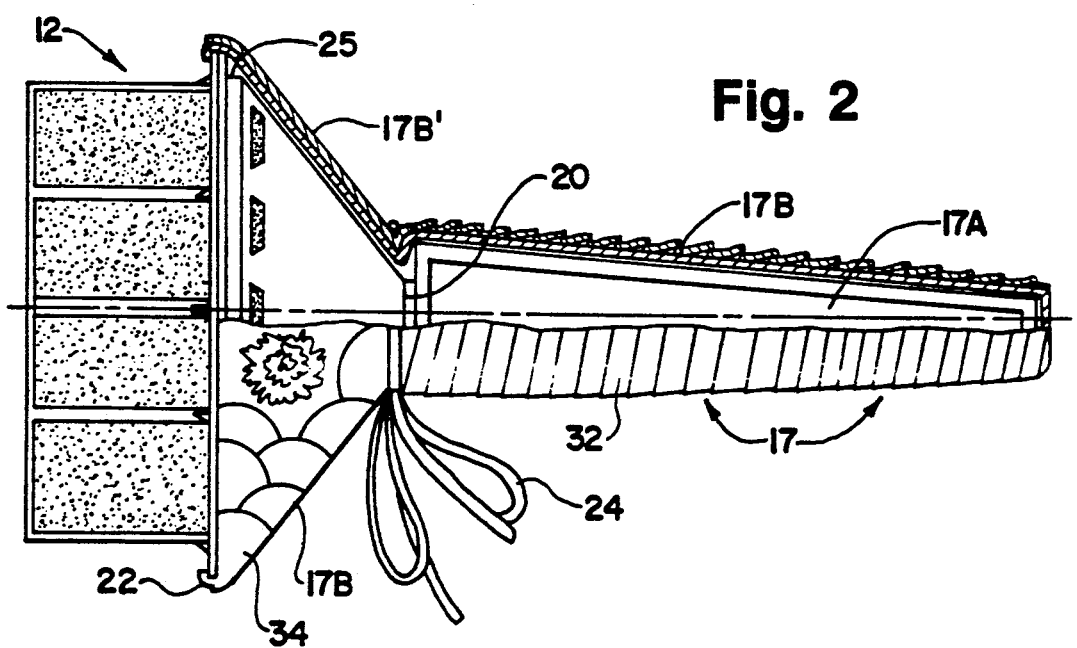
FIG. 2 is a plan view of another form of the preferred embodiment of FIG. 1 and shown partly in cross-section to show details of the inner and outer handle members.

Referring now to the drawings, particularly FIGS. 1 and 2, the bouquet holder assembly 10 of the present invention is seen to have a conventional head assembly 12 with an element 14 of suitable composite material for holding the stems of a bouquet of flowers (not shown) pushed into the element 14. The element 14 may be saturated with preservative in a moist base to keep the flowers fresh. It has a cylindrical part 14A contained within a cylindrical open cage 12A of the head 12 and a conical part 14B contained within a conical wall 12B. The cylindrical cage 12A and the conical wall 12B of the holding element 12 share a common central axis of symmetry 16 and are secured together by adhesive around respective complementary, circumferential connecting elements 12A' and 12B' of the head assembly 12.

The improved handle assembly 17 of the invention is attached at one end to the relatively narrow back of the conical wall 12B opposite the connecting element 12B'. It extends away therefrom to a distal, free end along an axis of symmetry 18, best seen in FIG. 1, which forms an obtuse angle with respect to the central axis of symmetry 16 of the head 12. The handle assembly 17 has two members: a relatively rigid, inner handle member 17A and an outer handle member 17B. The inner handle member 17A has an elongate, substantially flat, thin, planar body with a uniform thickness of approximately one-eighth inch as best seen in the side view of FIG. 1. As best seen in the plan view of FIG. 2, the inner handle member 17A has a width which tapers from a maximum of approximately seven-eighths inch at its fixed end to a minimum width of approximately three-eighths inch at the distal end. The relatively wider fixed end of the inner handle member 17A is attached to the back of the conical wall 12B at a relatively narrow neck 20.

During assembly, the cylindrical part 14A of the holding element 14 is first inserted into a cylindrical cage 12A. Adhesive is then applied to the complementary circumferential connecting member 12B', the conical portion 14B of the holding element 14 is inserted into the conical wall 12B of the head 12, and connecting member 12B' is adhered to connecting member 12A', or members 12A' and 12B' are fused or clipped together.

As noted above, this sub-assembly of the holding element 14 with the cylindrical cage 12A and the conical wall 12B of the head 12 and inner handle member 17A of the handle assembly 17 have been usually shipped ready to use to florists and the like for assembly with bouquets pursuant to customer orders.

In order to keep costs of manufacture at a minimum, the conical wall 12B and the inner handle member 17A are integrally formed together of molded plastic with a hard, smooth surface. However, it has been known, to decorate the inner handle member 17A by manually wrapping it with relatively non-absorbent thin ribbons of rayon, silk or the like at the florist's shop pursuant to customer orders, as to color, design, material, etc. The conical wall 12B, on the other hand, has been covered with silk petals. Both the petals and ribbons have been held in place by means of adhesive. The petals and the ribbon could only be used once, and the labor of wrapping and gluing was lost once the sub-assembly of element 14, head 12 and inner handle 17A was discarded. Neither the petals nor the ribbon had their own structural integrity to maintain a configuration like that of the conical wall 12B and inner handle member 17A to which they were attached.

In achieving the objective of the invention, these and the other disadvantages noted above with respect to bouquet holders with no outer wrap, are overcome through provision of the outer handle member 17B with its own structural integrity to maintain a configuration like that of the inner handle member 17A independently of support by the inner handle member 17A. This feature enables the outer handle member to be slid onto the inner handle member 17A which enables it to be manufactured on automated basis apart from the inner handle member 17A to which it is ultimately attached.

Although adhesive 25, FIG. 2 can be used, if desired, in keeping with another aspect of the invention, the outer handle member 17B is held against being slid off the inner handle member 17 by means of releasible connectors, such as a hook 22, or a ribbon 24 cinched tight around the outer handle member 17B at the neck 20. This enables the outer handle member to be easily removed for a keepsake or for reuse.

The outer handle member 17B preferably carries an open conical extension 17B' at its open end which covers the conical wall 12B of the head assembly 12. The ribbon 24 is tied or cinched at the juncture between the extension 17B' and the outer handle member 17B at neck 20, while the releasible hooks 22 are carried adjacent the periphery of the open end of the extension 17B' and releasibly attached to circumferential connecting member 12A'.

While numerous different materials can be used to construct the outer handle member 17B and extension 17B', preferably they are made from flexible, relatively moisture absorbent cloth or other material which is cut flat to conform to the shape and size of the inner handle member 17A and, preferably, also of extension 17B'. The cloth is then folded and joined together at a seam along one side, preferably by sewing.

In the preferred embodiment, the outer member 17B and extension 17B' are formed of two plys, or flexible layers: an outer, decorative layer 26 and an inner layer 28 of highly moisture absorbent sponge-like material. The outer decorative layer 26 is also moisture absorbent but preferably the inner layer 28 is relatively more moisture absorbent than the outer layer 26. This helps to wick moisture away from the outer layer 26 after it is first absorbed to keep the outer layer 26 relatively dry.

The outer layer 26 preferably has decorative elements, such as brocaded flowers 30, FIG. 1; ribbon-like decorative elements 32 of moisture absorbent material, shown in FIG. 2, and imitation flower petals 34, also shown in FIG. 22. In the case of ribbon-like decorative elements 32, the ribbon can be wrapped round the inner layer 28 on a form and sewn in place by automatic wrapping machine at a manufacturing facility to eliminate hand labor. The imitation petals 34 on the extension 17B' likewise can be sewn to the inner layer or, instead, can be woven as an integral part of the inner layer 28. Other decorative elements are contemplated including sequins, buttons, special stitching and the like. The outer decorative layer 26 could also be made to order from the same cloth as the customer's clothing, such as the bridal gown.

Preferably, the inner layer 28 comprises a single ply of material. However, multi-ply inner layers are contemplated with a relatively rigid plastic innermost ply. However, preferably, the inner layer 28 of extension 17B' covering the conical wall 12B is flexible to enable it to be flattened during shipping. The inner layer 28 can also carry a perfume while an antiperspirant is preferably carried by the outer layer 26.

While the entire bouquet holder assembly of the present invention could easily be made at one location by the same manufacturer, another objective of the invention is achieved by means of a method of manufacturing in which the outer handle member, or sheath, 17B of multiple styles are assembled according to customer's order with the uni-style plastic inner handle member 17A, head 12 and element 14. Specifically, this method comprises the steps of manufacturing a plurality of the relatively rigid inner handle elements and relatively rigid head and holder elements together with a substantially identical size and shape at a first location. The relatively flexible outer handle element are manufactured at a second location in a selected plurality of different styles, all of which are of substantially identical in size and shape to those of the plurality of assembled heads and relatively rigid handles to attachably slide onto the relatively rigid handles. A plurality of substantially identical assembled heads and handles are shipped to a third location where orders for bouquets are received which is spaced from said first and second locations to which are also shipped a plurality of flexible handles. The complete bouquet assemblies are then made at the third location by assembling relatively rigid uni-style head assemblies with relatively flexible outer handle elements of different styles selected according to orders received at said third location by sliding a selected outer handle element onto an inner handle element.

Figure 3:
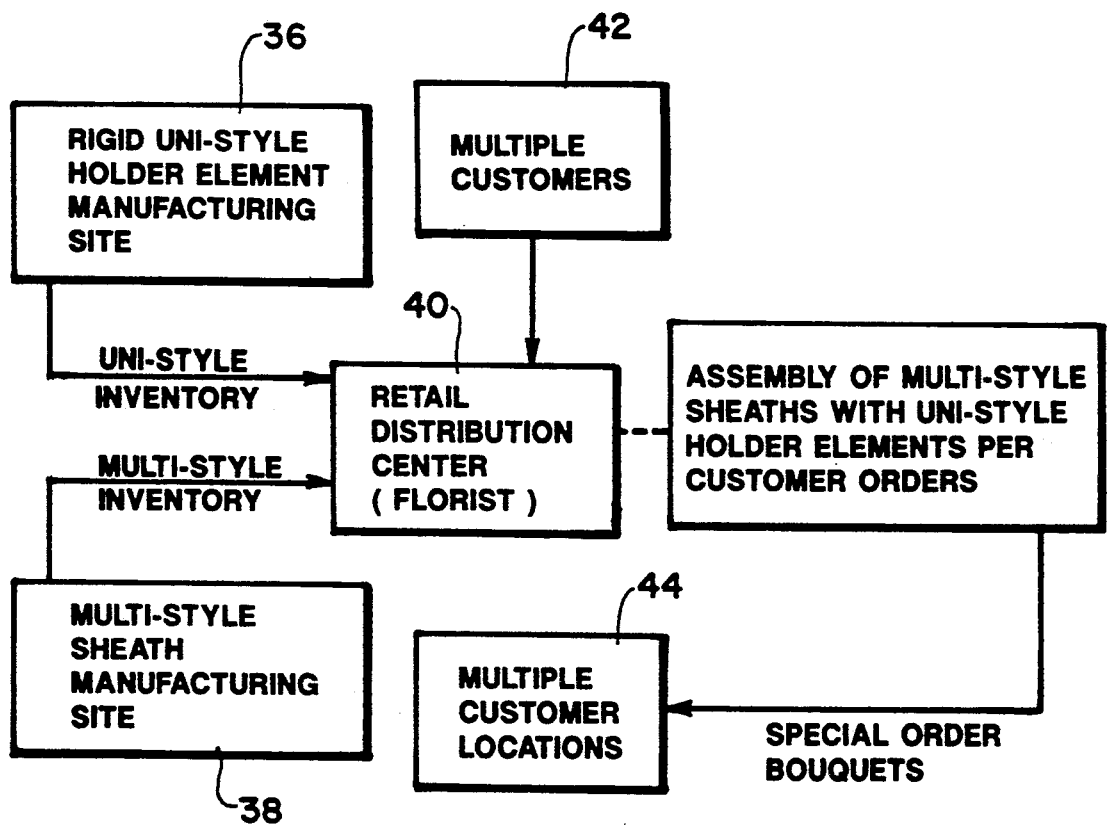
FIG. 3 is a block diagram for illustrating the steps of the preferred method of manufacturing the bouquet holder assembly of FIGS. 1 and 2.

This method is generally illustrated in FIG. 3 in which the rigid uni-style holder elements are made at manufacturing site 36 and the multi-style sheaths are made at manufacturing site 38. These are both sent to a retail distribution center, such as a florist shop, 40. There, special orders from multiple customers 42 are received, and selected ones of the multi-style sheaths are assembled together with any one of the uni-style holder elements pursuant to those customer orders. The specially assembled bouquet holders with bouquets are then delivered to the selected multiple customer locations 44.

Usually, the first and second locations are spaced from one another. In any event, the bouquet holder assembly is manufactured by a method comprising the steps of producing a head assembly having a holding medium attached to a relatively rigid elongate inner handle; manufacturing a sheath having a shape and size to slideably receive the elongate inner handle therewithin; and assembling the head assembly with the sheath by inserting the elongate handle into the sheath. The step of manufacturing the sheath includes the step of manufacturing a sheath extension attached thereto at one end for covering a head portion of the head assembly. The step of assembly includes the step of inserting the head portion of the head assembly into said sheath extension when the elongate handle is fully inserted into the sheath.

While a detailed description of the preferred embodiment of bouquet holder assembly has been given, it should be appreciated that many variations may be made without departing from the scope of the invention as set forth in the appended claims.

I claim:

1. In a bouquet holder assembly having a head with an element for holding the stems of a bouquet of flowers, the improvement being a handle assembly for holding the bouquet in a person's hand, comprising:
- a relatively rigid inner handle member having a smooth, solid body extending between a distal end and an opposite end attached to the head but spaced from the stems; and
- an outer handle member surrounding a substantial portion of said inner handle, said outer handle member having a relatively flexible hollow body with its own structural integrity to maintain a configuration like that of the solid body of the inner handle member but independently of support by the inner handle member to enable it to be slid onto the inner handle member.

2. The bouquet holder assembly of claim 1 in which said outer handle member has a substantially flexible layer of material which is relatively moisture absorbent compared to the inner handle.

3. The bouquet holder assembly of claim 2 in which said relativley moisture absorbent layer of material is sponge-like.

4. The bouquet holder assembly of claim 2 in which said relatively moisture absorbent layer carries a perfume.

5. The bouquet holder assembly of claim 2 in which said outer handle member has an outer layer overlying said substantially flexible layer and made of decorative cloth.

6. The bouquet holder assembly of claim 5 in which said decorative cloth is composed of ribbon-like members wrapped at least partially around the substantially flexible layer of material.

7. The bouquet holder assembly of claim 2 in which said substantially flexible layer of material includes decorative cloth.

8. The bouquet holder assembly of claim 1 in which said outer handle member includes a layer with decorative elments.

9. The bouquet holder assembly of claim 1 in which said outer handle member includes
- an elongate inner base layer,
- a length of ribbon wrapped around the inner base layer along its length, and
- means for securing the length of ribbon to the inner base layer to prevent it from separating therefrom.

10. The bouquet holder assembly of claim 9 in which said securing means includes adhesive.

11. The bouquet holder assembly of claim 1 including an outer handle extension member surrounding a significant portion of the head adjacent the end of the inner handle member attached to the head.

12. The bouquet holder assembly of claim 11 in which said outer handle extension member has its own structural integrity to maintain a configuration independently of the head portion which it surrounds.

13. The bouquet holder assembly of claim 11 in which said outer head handle extension member is relatively moisture absorbent relative to the head portion which it covers.

14. The bouquet holder assembly of claim 11 in which said outer handle extension member is made of cloth carrying decorative elements.

15. The bouquet holder assembly of claim 11 in which said outer handle extension member has a pair of opposite open ends, and said outer handle member has an open end, and including
means for attaching the open end of the outer handle member to one of the opposite open ends of the outer handle extension.

16. The bouquet holder assembly of claim 11 in which
said head portion is generally conical, and
said outer handle extension member has a conical shape generally conforming to that of the conical head portion.

17. The bouquet holder assembly of claim 1 in which said relatively flexible body extends between an open end and a closed end to form a sheath for receipt of the relatively rigid handle member therewithin.

18. The bouquet holder assembly of claim 1 in which said entire outer handle member is flexible relative to the relatively rigid inner handle member.

19. The bouquet holder assembly of claim 1 including means for holding the outer element against sliding off the inner handle member.

20. The bouquet holder assembly of claim 19 in which said holding means includes adhesive.

21. The bouquet holder assembly of claim 19 in which said holding means includes a tie member tied around the outer handle member.

22. The bouquet holder assembly of claim 19 in which
said outer handle member has an outer handle extension member attached thereto at one end thereof to cover a portion of the head, and
said holding means includes means for attaching the outer handle extension member to the head portion.

23. The bouquet holder assembly of claim 22 in which said handle extension attaching means includes adhesive.

24. The bouquet holder of claim 1 in which said outer handle member has a thickness at least as great as that of the inner handle member.

25. In a bouquet holder assembly having a head with an element for holding the stems of a bouquet of flowers, the improvement being a handle assembly for holding the bouquet in a person's hand, comprising:
- a relatively rigid inner handle member having a body extending between a distal end and an opposite end attached to the head having a relatively wider inner handle extension member attached to the inner handle member at one end thereof to cover a portion of the head;
- an outer handle member surrounding a substantial portion of said inner handle, said outer handle member having a relatively flexible body with its own structural integrity to maintain a configuration like that of the inner handle member but independently of support by the inner handle member to enable it to be slid onto the inner handle member; and
- means for holding the outer element against sliding off the inner handle member including
- a tie member tied around the outer handle member adjacent the one end to hold the outer handle extension member against being removed from the covered head portion.

26. In a bouquet holder assembly having a head with an element for holding the stems of a bouquet of flowers, the improvement being a handle assembly for holding the bouquet in a person's hand, comprising:
- a relatively rigid inner handle member having a body extending between a distal end and an opposite end attached to the head;

an outer handle member surrounding a substantial portion of said inner handle, said outer handle member having a relatively flexible body with its own structural integrity to maintain a configuration like that of the inner handle member but independently of support by the inner handle member to enable it to be slid onto the inner handle member; and an outer handle extension member surrounding a significant portion of the head adjacent the end of the inner handle member attached to the head having an inner layer, and an outer layer of decorative cloth which is relatively less moisture absorbent than the inner layer.

27. In a bouquet holder assembly having a head with an element for holding the stems of a bouquet of flowers, the improvement being a handle assembly for holding the bouquet in a person's hand, comprising:

a relatively rigid inner handle member having a body extending between a distal end and an opposite end attached to the head; and an outer handle member surrounding a substantial portion of said inner handle, said outer handle member having a relatively flexible body with its own structural integrity to maintain a configuration like that of the inner handle member but independently of support by the inner handle member to enable it to be slid onto the inner handle member, and a substantially flexible layer of material which is relatively moisture absorbent compared to the inner handle, including an outer moisture absorbent layer which is relatively more absorbent than the inner handle to absorb moisture from a person's hand, and an inner moisture absorbent layer which is relatively more absorbent than the outer layer to absorb moisture therefrom.

28. In a bouquet holder assembly having a head with an element for holding the stems of a bouquet of flowers, the improvement being a handle assembly for holding the bouquet in a person's hand, comprising:

a relatively rigid inner handle member having a body extending between a distal end and an opposite end attached to the head; and an outer handle member surrounding a substantial portion of said inner handle, said outer handle member having a relatively flexible body with its own structural integrity to maintain a configuration like that of the inner handle member but independently of support by the inner handle member to enable it to be slid onto the inner handle member and padding.

29. In a bouquet holder assembly having a head with an element for holding the stems of a bouquet of flowers, the improvement being a handle assembly for holding the bouquet in a person's hand, comprising:

a relatively rigid inner handle member having a body extending between a distal end and an opposite end attached to the head; and an outer handle member surrounding a substantial portion of said inner handle, said outer handle member having a relatively flexible body with its own structural integrity to maintain a configuration like that of the inner handle member but independently of support by the inner handle member to enable it to be slid onto the inner handle member, and carrying an antiperspirant for contact with a person's hand holding the bouquet holder assembly by the outer handle member.

30. In a bouquet holder assembly having a head with an element for holding the stems of a bouquet of flowers, the improvement being a handle assembly for holding the bouquet in a person's hand, comprising:

a relatively rigid inner handle member having a smooth, solid body extending between a distal end and an opposite end attached to the head but spaced from the stems with a relatively narrow neck adjacent the head;

an outer handle member surrounding a substantial portion of said inner handle, said outer handle member having a relatively flexible hollow body with its own structural integrity to maintain a configuration like that of the solid body of the inner handle member but independently of support by the inner handle member to enable it to be slid onto the inner handle member; and means for holding the outer element against sliding off the inner handle member including a tie member tied around the handle member at the neck.

* * * * *

UNITED STATES PATENT AND TRADEMARK OFFICE
CERTIFICATE OF CORRECTION

PATENT NO. : 5,070,644

DATED : December 10, 1991

INVENTOR(S) : Doris M. Hasty

It is certified that error appears in the above-identified patent and that said Letters Patent is hereby corrected as shown below:

Col. 5, line 51, change "22" to - 2 -;

Col 7, line 21, change "relativley" to -relatively-;

Col. 7, line 39, change "elments" to - elements -.

Signed and Sealed this

Tenth Day of August, 1993

Attest:

MICHAEL K. KIRK

*Attesting Officer*     Acting Commissioner of Patents and Trademarks